No. 750,007. PATENTED JAN. 19, 1904.
J. H. SCOTT.
COMBINED MUD AND DUST GUARD FOR VEHICLES.
APPLICATION FILED JUNE 14, 1898.
NO MODEL.
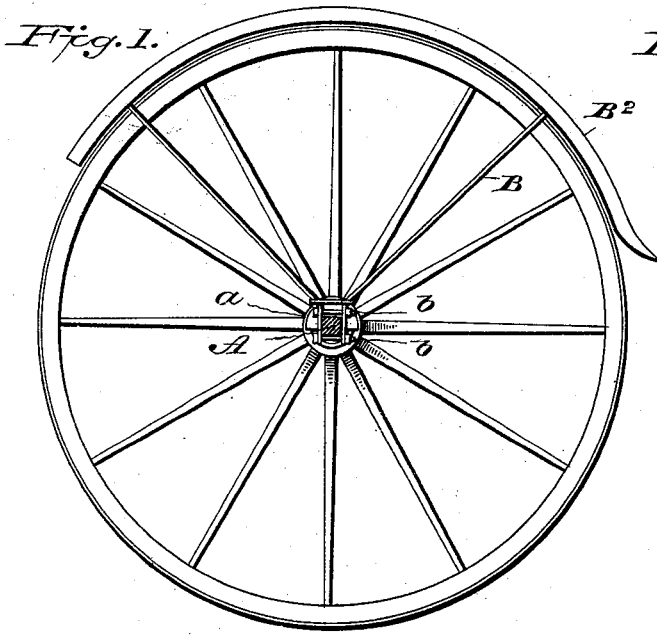
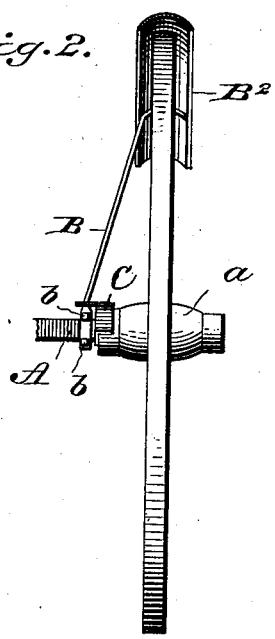
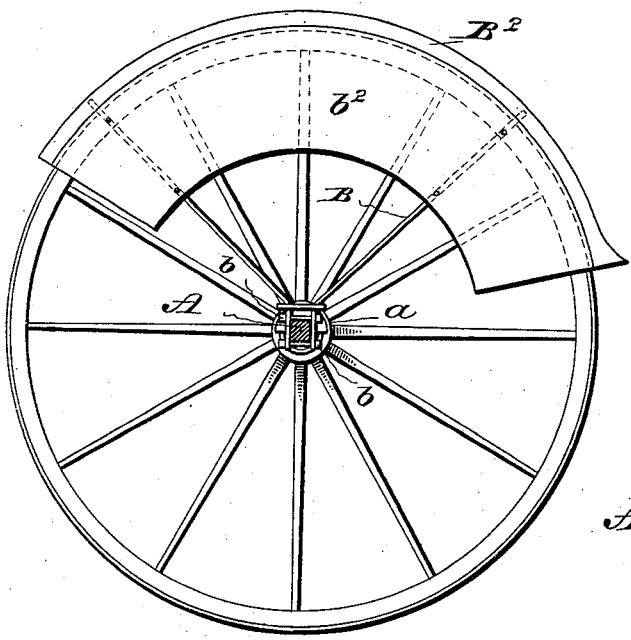
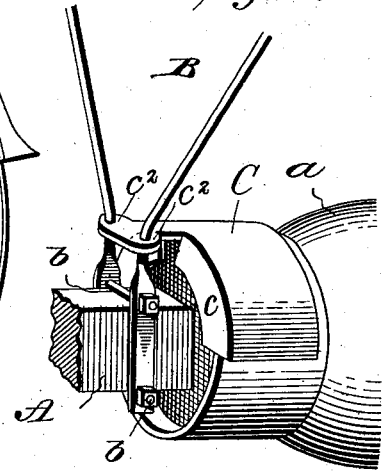
WITNESSES:
J. S. Elliott.
Belle Elliott.
INVENTOR:
John H. Scott,
by his attorney.
THE NORRIS PETERS CO., PHOTO-LITHO., WASHINGTON, D. C.

No. 750,007. Patented January 19, 1904.

UNITED STATES PATENT OFFICE.

JOHN HENRY SCOTT, OF HUNTINGTON, UTAH.

COMBINED MUD AND DUST GUARD FOR VEHICLES.

SPECIFICATION forming part of Letters Patent No. 750,007, dated January 19, 1904.

Application filed June 14, 1898. Serial No. 683,420. (No model.)

*To all whom it may concern:*

Be it known that I, JOHN HENRY SCOTT, a citizen of the United States, residing at Huntington, in the county of Emery and State of Utah, have invented certain new and useful Improvements in Mud and Dust Guards; and I do hereby declare the following to be a full, clear, and exact description of the invention, such as will enable others skilled in the art to which it appertains to make and use the same.

This invention relates to mud and dust guards.

The object is to provide a fender adapted for use in connection with vehicles—such as carriages, buggies, wagons, and the like—which may be secured in position in such manner as to permit the wheel being removed for oiling or repair without interference with the fender and which at will may be used either as a mud-guard or as a combined mud-guard and dust-fender.

With these objects in view the invention consists in the novel construction and combination of parts of a combined mud and dust guard fender for vehicles, as will be hereinafter fully described and claimed.

In the accompanying drawings, forming a part of this specification, and in which like letters of reference indicate corresponding parts, I have illustrated two forms of embodiment of my invention—that is to say, a mud-guard pure and simple and a combined mud and dust guard—although it is to be understood that other forms of embodiment thereof may be employed without departing from the spirit of the same.

In the drawings, Figure 1 is a view in side elevation, showing a mud-guard positioned upon the axle of an ordinary carriage-wheel. Fig. 2 is a view in end elevation, displaying also a hub-shield for preventing mud and dirt from working in on the spindle or axle. Fig. 3 is a view similar to Fig. 1, showing the combined mud and dust guard in place on an axle. Fig. 4 is an enlarged detail view in perspective of the standard for supporting the guard in connection with a hub and showing on an enlarged scale the hub-shield for precluding dust from the axle.

Referring to the drawings, A designates the axle, and $a$ the hub of an ordinary wheel, and as these parts may be of any preferred construction a detailed description of them is deemed unnecessary.

The guard or fender comprises a support B, in this instance consisting of two rods, the lower ends of which are bent at an angle to the length of the rods to present two members of a clip, which are provided with suitable openings, through which pass bolts $b$, located, respectively, above and below the axle to hold the clip thus formed upon the axle. The rods being perforated at their lower ends and having bolts passed through them form themselves a clip for direct attachment to the axle. The upper end of each of these rods is bent at practically a right angle to its length, and to these bent portions is secured a fender or guard $B^2$, which is by preference approximately semicircular in cross-section and may be constructed of any suitable material, such as iron, steel, cast-iron, aluminium, rubber, leather, or a combination of these materials. The guard $B^2$ is of such shape as to encircle the upper portion of the wheel, but is supported in such relation thereto that there will be no danger of contact between the wheel and the guard. The clip is to be secured at the proper position with relation to the hub, but does not in any way interfere therewith, as the wheel may be removed without interference in any manner with the guard.

When it is desired to present a combined dust and mud guard, as shown in Fig. 3, suitable sides $b^2$ are secured to the guard and partially inclose the upper half of the wheel, these sides to be of any suitable material adapted for the purpose.

It will be seen from the foregoing description that the mud-guard is supported in such manner with relation to the wheel that in removing the wheel there will be no interference with the guard and that the guard may be readily secured upon or removed from the axle at will.

The device is simple of construction, may be cheaply made, will be found highly effective and durable in use, and may be attached to any kind of vehicle in common use without in the least altering its construction.

To increase the efficiency of this device, I may employ a hub-shield to prevent dirt or dust from working into the axle or spindle. This shield consists of a piece of metal having its body portion C bent to inclose the upper half of the butt of the hub and its rear portion $c$ bent at right angles to the portion C to form an end plate. Projecting rearward from the portion C is an extension formed with two perforated ears $c^2$, through which pass the rods of the support B, the bolts $b$ when clamped in proper position serving to hold the shield securely in place.

While the guard protects the vehicle generally from mud and the like, the hub-shield prevents dust, &c., caught and thrown downward by the guard from working in on the spindle or axle, the two together keeping the whole vehicle from being covered with mud, dust, and the like.

I am aware that it is old to secure fenders in position upon the axle by attaching them to the nut end of the axle by various devices; but such arrangement is deficient in utility, for the reason that every time the wheel has to be removed the guard has also to be removed. By the simple arrangement presented by this invention this objectionable feature is entirely obviated.

Having thus fully described my invention, what I claim as new, and desire to secure by Letters Patent of the United States, is—

1. A combined mud and dust guard for vehicles, comprising two rods, flattened at their lower ends, the said flattened portions being substantially parallel and constructed to be attached to the axle inside the hub, and carrying a sand-band, and the up portions of said rods being flared outward and carrying at their outer ends a mud-guard, substantially as described.

2. In a combined sand-band and dust-guard for vehicles, a sand-band carried by substantially parallel flattened rods, a mud-guard carried by an elongation of said rods bent along divergent lines, and said guard being constructed to approximate the shape of the tire and remain rigidly in juxtaposition thereto, and means for attaching said rods to the axle substantially as described.

In testimony whereof I affix my signature in presence of two witnesses.

JOHN HENRY SCOTT.

Witnesses:
   H. E. DOUGLAS,
   JAMES O. SCOTT.